(12) United States Patent
Sanz et al.

(10) Patent No.: US 11,104,803 B2
(45) Date of Patent: Aug. 31, 2021

(54) LOW MODULUS SILYLATED MASTIC COMPOSITION

(71) Applicant: Bostik SA, Colombes (FR)

(72) Inventors: Federico Sanz, Choisy au Bac (FR); Jérémy Becquet, Sivry-Courtry (FR)

(73) Assignee: Bostik SA, Colombes (FR)

( * ) Notice: Subject to any disclaimer, the term of this patent is extended or adjusted under 35 U.S.C. 154(b) by 99 days.

(21) Appl. No.: 16/614,478

(22) PCT Filed: May 22, 2018

(86) PCT No.: PCT/EP2018/063381
§ 371 (c)(1),
(2) Date: Nov. 18, 2019

(87) PCT Pub. No.: WO2018/215463
PCT Pub. Date: Nov. 29, 2018

(65) Prior Publication Data
US 2020/0095377 A1 Mar. 26, 2020

(30) Foreign Application Priority Data
May 23, 2017 (FR) ...................... 1754554

(51) Int. Cl.
| | | |
|---|---|---|
| *C08L 83/06* | (2006.01) | |
| *C08L 71/02* | (2006.01) | |
| *C08L 75/04* | (2006.01) | |
| *C08K 3/26* | (2006.01) | |
| *C08G 65/336* | (2006.01) | |
| *C08G 77/04* | (2006.01) | |
| *C08L 101/00* | (2006.01) | |

(52) U.S. Cl.
CPC ............ *C08L 83/06* (2013.01); *C08G 65/336* (2013.01); *C08G 77/045* (2013.01); *C08K 3/26* (2013.01); *C08K 2003/265* (2013.01); *C08L 101/00* (2013.01)

(58) Field of Classification Search
CPC ........................................................ C08K 3/26
See application file for complete search history.

(56) References Cited

U.S. PATENT DOCUMENTS

| | | | | |
|---|---|---|---|---|
| 2002/0115811 A1* | 8/2002 | Huang | ................. | C08L 71/02 528/24 |
| 2010/0267879 A1 | 10/2010 | Isozaki et al. | | |
| 2012/0009366 A1* | 1/2012 | Galbraith | ............... | E06B 3/6733 428/34 |
| 2014/0155545 A1* | 6/2014 | Stanjek | ................... | C08L 89/04 524/588 |
| 2017/0369740 A1* | 12/2017 | Stanjek | ................. | C08K 3/013 |

FOREIGN PATENT DOCUMENTS

| | | |
|---|---|---|
| EP | 2886575 A1 | 6/2015 |
| WO | 2016174009 A1 | 11/2016 |
| WO | 2016202359 A1 | 12/2016 |

OTHER PUBLICATIONS

ISA/EP; International Search Report and Written Opinion for International Patent Application No. PCT/EP2018/063381 dated Jul. 10, 2018, 12 pages.

* cited by examiner

*Primary Examiner* — Mark S Zimmer
(74) *Attorney, Agent, or Firm* — NK Patent Law

(57) ABSTRACT

The present invention concerns a composition comprising: —0.68% to 1.00% by weight of a silsesquioxane (A) comprising at least one phenyl group and at least one alkoxy group; —at least one silylated polymer comprising at least one alkoxysilane group, preferably 3% to 80% of at least one silylated polymer comprising at least one alkoxysilane group; and at least 25% by weight of at least one carbonated filler, percentages by weight being expressed with respect to the total weight of said composition, as well as the use of same as a mastic, in particular as a mastic for construction.

18 Claims, No Drawings

LOW MODULUS SILYLATED MASTIC COMPOSITION

CROSS-REFERENCE TO RELATED APPLICATIONS

This application is a U.S. National Stage application of International Patent Application No. PCT/EP2018/063381, filed on May 22, 2018, which claims the benefit of French Patent Application No. 1754554, filed on May 23, 2017, the entire contents of which are all hereby incorporated herein by reference.

FIELD OF THE INVENTION

The present invention relates to a composition suitable for the preparation of low modulus silylated sealant.

The present invention also relates to the use of at least one silsesquioxane for preparing a low modulus sealant composition.

TECHNICAL BACKGROUND

Sealants are widely used in the construction field, in particular for assembling substrates, for example made of concrete or of steel, via expansion joints and for making it possible, by virtue of their mechanical and in particular elastic properties, to obtain a joint which is stable to the dimensional variations brought about by changes in temperature.

Mention may be made, among the desirable properties of a construction sealant, inter alia, of its ability to adhere to a variety of substrates, its resistance to weather conditions (UV, ozone, water), its elasticity, and the like. The movement capability is a property closely related to the modulus of elasticity. The modulus of elasticity can make it possible to predict the properties of extension or of compression of a sealant. The modulus is typically the ratio of the force (stress) necessary to draw a sealant (strain) to a certain point, typically to 100%. The elongation is the length to which the sealant can extend, expressed as a percentage of its initial size. The modulus has a direct effect on the capability for elongation as the lower the tensile strength, the more easily the mastic can be stretched.

Low modulus sealants tend to have a high capability for deformation and for resilience (elastic recovery), which sealants are capable of adjusting to significant movements without generating an excessively high tension on the sealant or the substrate. Low modulus sealants in particular are more flexible and are stretched more easily still. High modulus sealants typically have a lower capability for deformation and are instead recommended for uses with few expected movements where high tensile forces are required. High modulus sealants are so resistant that they generate a high tension on the adhesive joints or the substrates. In the case of substrates such as concrete, this tension can be sufficient to damage the substrates and/or the joint.

There exists in particular a need for novel compositions suitable for the preparation of low module sealant, exhibiting in particular a good compromise between good mechanical properties, good elastic properties (elongation and elastic recovery) and good adhesive properties, preferably without use of primer.

DESCRIPTION OF THE INVENTION

The present invention relates to a composition comprising:
from 0.68% to 1.00% by weight of at least one silsesquioxane (A) comprising at least one phenyl group and at least one alkoxy group;
at least one silylated polymer comprising at least one alkoxysilane group, preferably from 3% to 80% of at least one silylated polymer comprising at least one alkoxysilane group; and
at least 25% by weight of at least one carbonate filler,
the percentages by weight being expressed with respect to the total weight of said composition.

Silsesquioxane (A)

Silsesquioxanes are typically organosilicone compounds which can adopt a polyhedral structure or a polymeric structure, with Si—O—Si bonds. They typically have the following general structure:

$$[RSiO_{3/2}]_t$$

in which R, which is identical or different in nature, represents an organic radical and t is an integer which can vary from 6 to 12, t preferably having the value 6, 8, 10 or 12.

According to one embodiment, the silsesquioxane (A) has a polyhedral structure (or POSS for "Polyhedral Oligomeric Silsesquioxane").

Preferably, the silsesquioxane (A) corresponds to the following general formula (I):

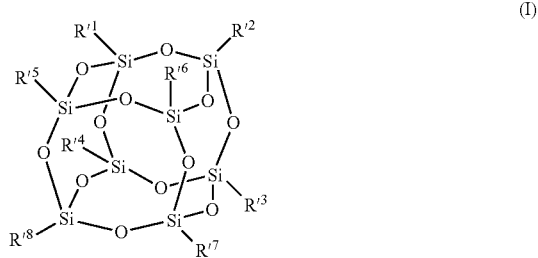

(I)

in which each of $R'^1$ to $R'^8$ represents, independently of one another, a group chosen from:
a hydrogen atom,
a radical chosen from the group consisting of a linear or branched $C_1$-$C_4$ alkoxy radical, a linear or branched alkyl radical comprising from 1 to 30 carbon atoms, an alkenyl radical comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms and an acyl radical comprising from 1 to 30 carbon atoms, and
an —$OSiR'^9R'^{10}$ group in which $R'^9$ and $R'^{10}$ each represents, independently of each other, a hydrogen atom or a radical chosen from the group consisting of linear or branched $C_1$-$C_4$ alkyls, linear or branched $C_1$-$C_4$ alkoxys, $C_2$-$C_4$ alkenyls, a phenyl, a $C_3$-$C_6$ allyl radical, a cyclic $C_3$-$C_8$ aliphatic radical and a $C_1$-$C_4$ acyl radical;

provided:
that at least one radical among the $R'^1$ to $R'^8$ radicals is a $C_1$-$C_4$ alkoxy radical; and
that at least one radical among the $R'^1$ to $R'^8$ radicals is a phenyl radical.

Preferably, in the abovementioned formula (I), each of $R'^1$ to $R'^8$ represents, independently of one another, a group chosen from:
- a hydrogen atom,
- a radical chosen from the group consisting of a linear or branched $C_1$-$C_4$ alkoxy radical, a linear or branched alkyl radical comprising from 1 to 30 carbon atoms, preferably from 1 to 12 carbon atoms, preferentially from 1 to 8 carbon atoms and, for example, from 1 to 5 carbon atoms, and an aromatic radical comprising from 6 to 30 carbon atoms, preferably from 6 to 12 carbon atoms, and
- an —$OSiR'^9R'^{10}$ group in which $R'^9$ and $R'^{10}$ each represents, independently of each other, a hydrogen atom or a radical chosen from linear or branched $C_1$-$C_4$ alkyls, for example methyl or ethyl, preferably methyl, provided:
that at least one radical among the $R'^1$ to $R'^8$ radicals is a $C_1$-$C_4$ alkoxy radical; and
that at least one radical among the $R'^1$ to $R'^8$ radicals is a phenyl radical.

Preferably, in the abovementioned formula (I), $R'^1$ to $R'^8$ each represent, independently of one another, a radical chosen from the group consisting of phenyl, methyl and methoxy, provided that at least one radical is a $C_1$-$C_4$ alkoxy radical and that at least one other radical is a phenyl radical.

According to the invention, the silsesquioxane (A), preferably of formula (I), can comprise from 10% to 20% by weight, preferably from 12% to 20% by weight, preferentially from 15% to 18% by weight, of alkoxy group, preferably methoxy group, with respect to the total weight of said silsesquioxane (A).

According to one embodiment, the silsesquioxane (A), preferably of formula (I), comprises at least one methyl group. Preferably, the silsesquioxane (A) comprises a phenyl group(s):methyl group(s) ratio by weight ranging from 1:10 to 10:1, preferably from 1:5 to 5:1, advantageously from 1:4 to 4:1, in particular from 1:2 to 2:1. For example, the phenyl group(s):methyl group(s) ratio by weight is 1:1 or 0.25:1.

According to one embodiment, the silsesquioxane (A), preferably of formula (I), has a viscosity at 23° C. ranging from 10 to 200 mPa·s, preferably from 14 to 180 mPa·s, advantageously ranging from 90 to 150 mPa·s, preferentially from 110 to 130 mPa·s. In particular, the silsesquioxane (A) has a viscosity at 23° C. of 14 mPa·s and preferably a number-average molecular weight ranging from 800 g/mol to 1300 g/mol. In particular, the silsesquioxane (A) has a viscosity at 23° C. of 120 mPa·s and preferably a number-average molecular weight ranging from 1000 g/mol to 1500 g/mol.

Generally, the viscosity can be measured in a way well known to a person skilled in the art. In particular, the viscosity can be measured with a Brookfield viscometer, the needle and the speed of the module being appropriately chosen as a function of the viscosity range to be measured.

According to one embodiment, the silsesquioxane (A), preferably of formula (I), has a number-average molecular weight ranging from 500 g/mol to 3000 g/mol, preferably from 800 g/mol to 2000 g/mol and advantageously from 800 g/mol to 1500 g/mol. For example, the silsesquioxane (A) has a weight-average molar mass ranging from 800 g/mol to 1300 g/mol or from 1000 to 1500 g/mol.

The number-average and weight-average molecular weights of the silsesquioxanes can be measured by methods well known to a person skilled in the art, for example by size exclusion chromatography using polystyrene-type standards.

The abovementioned composition can comprise a silsesquioxane (A) or a mixture of silsesquioxanes (A) of different natures.

According to one embodiment, the content of silsesquioxane (A) in the abovementioned composition is chosen from one of the following contents by weight: from 0.68% to 1.00%, from 0.69% to 1.00%, from 0.70% to 1.00%, from 0.71% to 1.00%, from 0.72% to 1.00%, from 0.73% to 1.00%, from 0.74% to 1.00%, from 0.75% to 1.00%, from 0.76% to 1.00%, from 0.77% to 1.00%, from 0.78% to 1.00%, from 0.79% to 1.00%, from 0.80% to 1.00%, from 0.81% to 1.00%, from 0.82% to 1.00%, from 0.83% to 1.00%, from 0.84% to 1.00%, from 0.85% to 1.00%, from 0.86% to 1.00%, from 0.87% to 1.00%, from 0.88% to 1.00%, from 0.89% to 1.00%, from 0.90% to 1.00%, from 0.91% to 1.00%, from 0.92% to 1.00%, from 0.93% to 1.00%, from 0.94% to 1.00%, or from 0.95% to 1.00% by weight, with respect to the total weight of said composition.

Mention may be made, by way of example of silsesquioxane (A), of those having one of the following CAS numbers: [68440-65-3], [68957-04-0], [68957-06-2] or [1211908-05-2].

Mention may be made, for example, of DC 3074® or DC 3037®, sold by Dow Corning.

Silylated Polymer Comprising at Least One Alkoxysilane Group

According to one embodiment, the silylated polymer comprising at least one alkoxysilane group is a polymer comprising at least one, preferably at least two, groups of formula (V):

$$—Si(R^4)_p(OR^5)_{3-p} \quad\quad (V)$$

in which:
$R^4$ and $R^5$, which are identical or different, each represent a linear or branched alkyl radical comprising from 1 to 4 carbon atoms;

p is an integer equal to 0, 1 or 2.

Preferably, the silylated polymers comprising at least one alkoxysilane group are chosen from silylated polyurethanes, silylated polyethers and their mixtures.

The silylated polymer comprising at least one alkoxysilane group can exhibit a number-average molecular weight ranging from 500 to 50 000 g/mol, more preferably ranging from 700 to 20 000 g/mol.

The number-average molecular weight of the polymers can be measured by methods well known to a person skilled in the art, for example by size exclusion chromatography using standards of polyethylene glycol type.

According to one embodiment, the silylated polymer comprising at least one alkoxysilane group is chosen from the polymers of formulae (II), (III) or (IV) as defined below, and their mixtures:

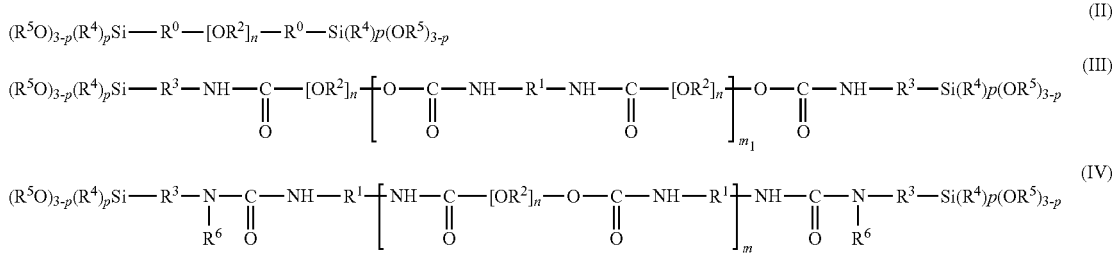

in which:

R$^1$ represents a divalent hydrocarbon radical comprising from 5 to 15 carbon atoms which can be aromatic or aliphatic and linear, branched or cyclic, R$^0$ represents a linear or branched divalent alkylene radical comprising from 3 to 6 carbon atoms, R$^3$ represents a linear or branched divalent alkylene radical comprising from 1 to 6 carbon atoms, R$^3$ preferably representing methylene or n-propylene, R$^2$ represents a linear or branched divalent alkylene radical comprising from 2 to 4 carbon atoms, R$^4$ and R$^5$, which are identical or different, each represent a linear or branched alkyl radical comprising from 1 to 4 carbon atoms, R$^4$ and R$^5$ preferably representing methyl, R$^6$ represents a hydrogen atom, a phenyl radical, a linear, branched or cyclic alkyl radical comprising from 1 to 6 carbon atoms, or a 2-succinate radical of formula:

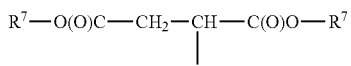

in which R$^7$ is a linear or branched alkyl radical comprising from 1 to 6 carbon atoms, n is an integer such that the number-average molecular weight of the polyether block of formula —[OR$^2$]$_n$— ranges from 300 g/mol to 40 000 g/mol in the polymers of formulae (II), (III) and (IV), m$_1$ is zero or an integer, n and m$_1$ are such that the number-average molecular weight of the polymer of formula (III) ranges from 500 g/mol to 50 000 g/mol, preferably from 700 g/mol to 20 000 g/mol, m is an integer other than zero, n and m are such that the number-average molecular weight of the polymer of formula (IV) ranges from 500 g/mol to 50 000 g/mol, preferably from 700 g/mol to 20 000 g/mol, p is an integer equal to 0, 1 or 2, p preferably being 0 or 1.

Preferably, the R$^1$ radical of the formulae (II), (III) and (IV) is chosen from one of the following divalent radicals, the formulae of which below show the two free valencies:

a) the divalent radical derived from isophorone diisocyanate (IPDI):

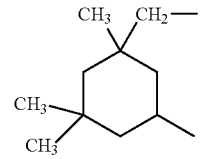

b) the divalent radical derived from 4,4'- and 2,4'-dicyclohexylmethane diisocyanate (HMDI):

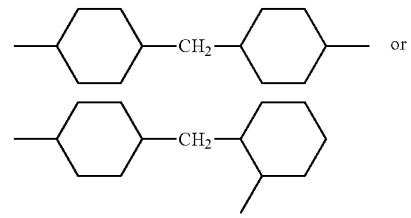

c) the radical derived from 2,4- and 2,6-toluene diisocyanate (TDI):

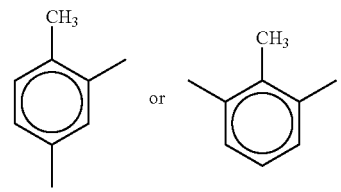

d) the radical derived from 4,4'- and 2,4'-diphenylmethane diisocyanate (MDI):

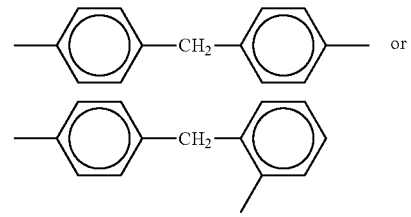

e) the radical derived from m-xylylene diisocyanate (m-XDI):

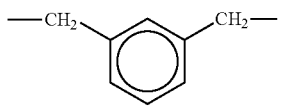

f) the radical derived from hexamethylene diisocyanate (HDI):

—(CH$_2$)$_6$—

Preferably, the R$^1$ radical of the formulae (II), (III) and (IV) is the divalent radical derived from isophorone diisocyanate or from xylylene diisocyanate.

The polymers of formula (III) can be obtained according to a process described in the documents EP 2 336 208 and WO 2009/106699.

Mention may be made, among the polymers corresponding to the formula (III), for example, of:
  Geniosil® STP-E10 (available from Wacker): polyether comprising two groups (V) of dimethoxy type (m$_1$ equal to 0, p equal to 1 and R$^4$ and R$^5$ represent a methyl group) exhibiting a number-average molecular weight of approximately 8889 g/mol where R$^3$ represents a methylene group;
  Geniosil® STP-E30 (available from Wacker): polyether comprising two groups of formula (V) of dimethoxy type (m$_1$ equal to 0, p equal to 1 and R$^4$ and R$^5$ represent a methyl group) exhibiting a number-average molecular weight of approximately 14 493 g/mol where R$^3$ represents a methylene group;
  SPUR$_+$® 1050MM (available from Momentive): polyurethane comprising two groups of formula (V) of trimethoxy type (m$_1$ other than 0, p equal to 0 and R$^5$ represents a methyl group) exhibiting a number-average molecular weight of approximately 21 000 g/mol where R$^3$ represents an n-propylene group;
  SPUR$_+$® Y-19116 (available from Momentive): polyurethane comprising two groups of formula (V) of trimethoxy type (m$_1$ other than 0 and R$^5$ represents a methyl group) exhibiting a number-average molecular weight ranging from 15 000 to 17 000 g/mol where R$^3$ represents an n-propylene group;
  Desmoseal® S XP 2636 (available from Bayer): polyurethane comprising two groups of formula (V) of trimethoxy type (m$_1$ other than 0, p equal to 0 and R$^5$ represents a methyl group) exhibiting a number-average molecular weight of approximately 15 038 g/mol where R$^3$ represents an n-propylene group.

Mention may also be made, by way of example of silylated polymer of formula (III), of Geniosil®XB502, a commercial product available from Wacker. This product Geniosil®XB502 comprises a mixture of two products (B) and (C), where
  (B) is a polymer of formula (III) with a number-average molecular weight of approximately 14 000 g/mol where m$_1$ is equal to zero, p is equal to 1, R$^5$ and R$^4$ each represent a methyl group, R$^3$ represents a methylene group and the —[OR$^2$]$_n$— group originates from a polypropylene glycol;
  (C) is a silsesquioxane (A) with a number-average molecular weight of approximately 800 g/mol terminated by methoxy groups (CAS 1211908-05-2), the products (B) and (C) being present in a (B)/(C) ratio by weight of approximately (25-30)/(70-75).

The polymers of formula (II) can be obtained by hydrosilylation of polyether diallyl ether according to a process described, for example, in the document EP 1 829 928.

Mention may be made, among the polymers corresponding to the formula (II), of:
  MS Polymer™ S303H (available from Kaneka), corresponding to a polyether comprising two groups of formula (V) of dimethoxy type (p is equal to 1 and R$^4$ represents a methyl group) having a number-average molecular weight of approximately 22 000 g/mol and a viscosity of 12.5 Pa·s at 23° C.;
  MS Polymer™ S227 (available from Kaneka), corresponding to a polyether comprising two groups of formula (V) of dimethoxy type (p is equal to 1 and R$^5$ and R$^4$ each represent a methyl group) having a number-average molecular weight of approximately 27 000 g/mol and a viscosity of 34 Pa·s at 23° C.

The polymers of formula (IV) can be obtained according to the following process:
a) reaction of a polyether polyol of following formula:

with a stoichiometric excess of diisocyanate of following formula: NCO—R$^1$—NCO in order to form a polyurethane-polyether block having at least two —NCO end groups, said block preferably comprising from 1.5% to 1.9% by weight of —NCO groups, and then
b) reaction between a block obtained in the preceding stage with a stoichiometric amount or a slight excess of an α-, β- or γ-aminosilane having the following formula:

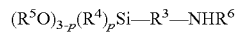

Such a process is described, for example, in WO 2013/136108.

Mention may be made, among the polymers corresponding to the formula (IV), of:
  SPUR$_+$ 1050 MM (available from Momentive), corresponding to a polyurethane polyether comprising two groups of formula (V) of trimethoxy type (p is equal to 0 and R$^5$ represents a methyl group) having a number-average molecular weight of approximately 20 000 g/mol and a viscosity of 35 Pa·s at 23° C.;
  SPUR$_+$ 1015 LM (available from Momentive), corresponding to a polyurethane polyether comprising two groups of formula (V) of trimethoxy type (p is equal to 0 and R$^5$ represents a methyl group) having a number-average molecular weight of approximately 25 000 g/mol and a viscosity of 50 Pa·s at 23° C.

The composition according to the invention can comprise a polymer of abovementioned formula (II) or a mixture of different polymers of abovementioned formula (II).

The composition according to the invention can comprise a polymer of abovementioned formula (III) or a mixture of different polymers of abovementioned formula (III).

The composition according to the invention can comprise a polymer of abovementioned formula (IV) or a mixture of different polymers of abovementioned formula (IV).

The composition according to the invention can comprise:
  at least one polymer of abovementioned formula (II) and at least one polymer of abovementioned formula (III);
  at least one polymer of abovementioned formula (II) and at least one polymer of abovementioned formula (IV);

at least one polymer of abovementioned formula (III) and at least one polymer of abovementioned formula (IV); or at least one polymer of abovementioned formula (II), at least one polymer of abovementioned formula (III) and at least one polymer of abovementioned formula (IV).

According to one embodiment, the abovementioned composition comprises at least one polymer of abovementioned formula (II) and at least one polymer of abovementioned formula (III) in a polymer(s) of formula (II)/polymer(s) of formula (III) ratio by weight of between 1/10 and 10/1, preferably between 1/5 and 5/1, preferentially between 2/5 and 5/2, advantageously between 2/5 and 3/5.

According to one embodiment, the composition according to the invention comprises:

at least one silylated polymer of formula (II), in which:
$p=0$ or 1, preferably $p=1$,
$R^0$ represents a divalent n-propylene radical,
$R^4$ and $R^5$ each represent a methyl group,
the number-average molecular weight of said polymer ranging from 5000 to 30 000 g/mol, preferably from 10 000 to 20 000 g/mol, and/or at least one silylated polymer of formula (III), in which:
$m_1$ is an integer equal to or different from 0,
$p=0$ or 1, preferably $p=0$,
$R^4$ and $R^5$ each represent a methyl radical,
$R^3$ represents a divalent methylene or n-propylene radical,
the number-average molecular weight of said polymer ranging from 5000 to 30 000 g/mol, preferably from 10 000 to 20 000 g/mol, in particular from 14 000 to 16 000 g/mol.

According to one embodiment, the composition according to the invention comprises:

at least one silylated polymer of formula (III), in which:
$m_1$ is an integer equal to or different from 0,
$p=0$,
$R^4$ and $R^5$ each represent a methyl radical,
$R^3$ represents a divalent n-propylene radical,
the number-average molecular weight of said polymer ranging from 5000 to 30 000 g/mol, preferably from 10 000 to 20 000 g/mol, in particular from 14 000 to 16 000 g/mol, and/or at least one silylated polymer of formula (III), in which:
$m_1$ is an integer equal to 0,
$p=1$,
$R^4$ and $R^5$ each represent a methyl radical,
$R^3$ represents a divalent methylene radical,
the number-average molecular weight of said polymer ranging from 5000 to 30 000 g/mol, preferably from 10 000 to 20 000 g/mol, in particular of approximately 14 000 g/mol, and/or at least one silylated polymer of formula (II), in which:
$p=0$ or 1, preferably $p=1$,
$R^0$ represents a divalent n-propylene radical,
$R^4$ and $R^5$ each represent a methyl group,
the number-average molecular weight of said polymer ranging from 5000 to 30 000 g/mol, preferably from 10 000 to 20 000 g/mol.

According to one embodiment, the composition according to the invention comprises from 3% to 80% by weight, preferably from 5% to 60% by weight, preferentially from 5% to 50% by weight, advantageously from 10% to 50% by weight, for example from 10% to 40% by weight, advantageously from 20% to 30% by weight, in particular from 22% to 24% by weight, of at least one silylated polymer comprising at least one alkoxysilane group, preferably chosen from the polymers of abovementioned formulae (II), (III) and (IV) and their mixtures, with respect to the total weight of said composition.

Carbonate Filler

According to one embodiment, the carbonate filler is chosen from alkali metal or alkaline earth metal carbonates and their mixtures; preferably, the carbonate filler is calcium carbonate.

The calcium carbonate can be rendered hydrophobic, for example with calcium stearate or an analog, making it possible to confer a partial or complete hydrophobicity on the calcium carbonate particles. The more or less hydrophobic character of calcium carbonate can have an impact on the rheology of the composition. Moreover, the hydrophobic coating can make it possible to prevent the calcium carbonate from absorbing the constituents of the composition and from rendering them ineffective. The hydrophobic coating of the calcium carbonate can represent from 0.1% to 3.5% by weight, with respect to the total weight of calcium carbonate.

The calcium carbonate which can be used in the present invention preferably has a particle size ranging from 0.1 to 400 μm, more preferably from 1 to 400 μm, preferentially from 10 to 350 μm, more preferably from 50 to 300 μm.

Mention may be made, by way of example of calcium carbonate, of Mikhart® 1T (available from La Provençale).

The composition according to the invention can comprise at least 25% by weight of at least one carbonate filler, preferably at least 30% by weight, preferentially at least 40% by weight, with respect to the total weight of the composition.

The composition according to the invention preferably comprises from 25% to 80% by weight, preferentially from 40% to 60% by weight, in particular from 45% to 55% by weight, of at least one carbonate filler, for example calcium carbonate, with respect to the total weight of the composition.

Composition

The composition according to the invention can comprise at least one catalyst. Preferably, the composition comprises at least one catalyst.

The catalyst can be any catalyst known to a person skilled in the art for the condensation of silanol. Mention may be made, as examples of such catalysts, of:

aminosilanes, such as 3-(N-(2-aminoethyl)amino)propyltrimethoxysilane (commercially available under the name Silquest® A-1120 from Momentive) or 3-aminopropyltrimethoxysilane, organotitanium derivatives, such as titanium acetylacetonate (commercially available under the name Tyzor® AA75 from DuPont de Nemours), aluminum, such as aluminum chelate (commercially available under the name K-KAT® 5218 from King Industries), amines, such as 1,8-diazabicyclo[5.4.0]undec-7-ene (DBU) or 1,5-diazabicyclo[4.3.0]non-5-ene (DBN), 2,2'-dimorpholinodiethyl ether (DMDEE) or 1,4-diazabicylo[2.2.2]octane (DABCO), tin-based catalysts, such as, for example, Neostann® S-1 or TIB-KAT® 216 (respectively available from Kaneka or TIB Chemicals). These tin-based catalysts are particularly suitable for silylated polymers of formula (II).

The catalyst or catalysts preferably represent from 0.1% to 1% by weight, preferentially from 0.1% to 0.6% by weight, advantageously from 0.3% to 0.6% by weight, of the total weight of the composition.

According to one embodiment, the composition additionally comprises at least one additive chosen from plasticizers, solvents, pigments, adhesion promoters, desiccants, UV stabilizers (or antioxidants), glitter, fluorescent materials, rheological additives, fillers other than carbonate fillers, and their mixtures.

According to one embodiment, the composition according to the invention comprises:

from 3% to 80% by weight, preferably from 5% to 50% by weight, preferentially from 10% to 50% by weight, advantageously from 10% to 40% by weight, of at least one silylated polymer comprising at least one alkoxysilane group as defined above, from 0.1% to 1% by weight, preferably from 0.1% to 0.6% by weight, of at least one catalyst as defined above, from 25% to 80% by weight, preferably from 40% to 60% by weight, of at least one carbonate filler, preferably calcium carbonate, from 0% to 30% by weight, in particular from 0.1% to 30% by weight, preferably from 0.5% to 20% by weight, preferentially from 0.5% to 15% by weight, of at least one additive chosen from plasticizers, solvents, pigments, adhesion promoters, desiccants, UV stabilizers (or antioxidants), glitter, fluorescent materials, rheological additives, fillers other than carbonate fillers, and their mixtures; and from 0.68% to 1.00% by weight, preferably from 0.69% to 1.00% by weight, preferentially from 0.75% to 1.00% by weight and advantageously from 0.80% to 1.00% by weight of at least one silsesquioxane (A) comprising at least one phenyl group and at least one alkoxy group as defined above, the percentages by weight being expressed with respect to the total weight of the composition.

In the context of the invention, "filler other than the carbonate filler" or also "filler" is understood to mean a filler which is not a carbonate filler.

The filler can be chosen from organic fillers, inorganic fillers and their mixtures.

Use may be made, as organic filler(s), of any organic filler and in particular polymeric filler typically used in the field of sealant compositions.

Use may be made, for example, of polyvinyl chloride (PVC), polyolefins, rubber, ethylene/vinyl acetate (EVA) or aramid fibers, such as Kevlar®.

Use may also be made of hollow microspheres made of expandable or non-expandable thermoplastic polymer. Mention may in particular be made of hollow microspheres made of vinylidene chloride/acrylonitrile.

The mean particle size of the filler(s) which can be used is preferably less than or equal to 10 microns, more preferably less than or equal to 3 microns, in order to prevent them from settling in the composition according to the invention during its storage.

The mean particle size is measured for a volume particle size distribution corresponding to 50% by volume of the sample of particles analyzed. When the particles are spherical, the mean particle size corresponds to the median diameter (D50 or Dv50), which corresponds to the diameter such that 50% of the particles by volume have a size smaller than said diameter. In the present patent application, this value is expressed in micrometers and determined according to the standard NF ISO 13320-1 (1999) by laser diffraction on an appliance of Malvern type.

Preferably, the filler is an inorganic filler.

The inorganic fillers can be provided in the form of particles of diverse geometry. They can, for example, be spherical or fibrous or exhibit an irregular shape.

According to one embodiment, the filler is chosen from sand, glass beads, glass, quartz, barite, alumina, mica or talc. Preferably, the filler is chosen from sand and glass beads.

The sand which can be used in the present invention preferably has a particle size ranging from 0.1 to 400 μm, preferentially from 1 to 400 μm, more preferably from 10 to 350 μm, more preferably from 50 to 300 μm.

The glass beads which can be used in the present invention preferably have a particle size ranging from 0.1 to 400 μm, preferentially from 1 to 400 μm, more preferably from 10 to 350 μm, more preferably from 50 to 300 μm.

The filler(s) (other than the carbonate filler(s)) preferably represent(s) from 0% to 30% by weight, preferably from 0% to 10% by weight, preferentially from 1% to 10% by weight, of the total weight of the composition.

The composition according to the invention can comprise at least one plasticizing agent in a proportion of 5% to 30% by weight, preferably of 10% to 30% by weight, preferentially of 15% to 25% by weight, with respect to the total weight of said composition.

Use may be made, by way of example of plasticizing agent which can be used, of any plasticizing agent generally used in the field of sealant compositions.

Preferably, use is made of:

diisodecyl phthalate, as sold under the name Palatinol™ DIDP by BASF, an ester of alkylsulfonic acid and of phenol, as sold under the name Mesamoll® by Lanxess, diisononyl 1,2-cyclohexanedicarboxylate, as sold under the name Hexamoll Dinch® by BASF, pentaerythritol tetravalerate, as sold under the name Pevalen™ by Perstorp.

The composition according to the invention can comprise at least one rheological agent.

Mention may be made, by way of example of rheological agent(s) which can be used, of any rheological agent generally used in the field of sealant compositions.

Preferably, use is made of one or more rheological agents chosen from thixotropic agents, and more preferably from:

PVC plastisols, corresponding to a suspension of PVC in a plasticizing agent which is miscible with PVC, obtained in situ by heating to temperatures ranging from 60° C. to 80° C. These plastisols can be those described in particular in the publication *Polyurethane Sealants*, Robert M. Evans, ISBN 087762-998-6, fumed silica, urea derivatives resulting from the reaction of an aromatic diisocyanate monomer, such as 4,4'-MDI, with an aliphatic amine, such as butylamine. The preparation of such urea derivatives is described in particular in the application FR 1 591 172.

micronized starch waxes, such as Crayvallac SLX, sold by Arkema.

The total content of rheological agent(s) which can be used can vary from 1% to 30% by weight, preferably from 5% to 30% by weight, more preferably from 10% to 25% by weight, with respect to the total weight of the composition according to the invention.

The solvent is preferably a solvent which is volatile at ambient temperature (temperature of the order of 23° C.). The volatile solvent can, for example, be chosen from alcohols which are volatile at ambient temperature, such as ethanol or isopropanol. The volatile solvent makes it possible, for example, to reduce the viscosity of the composition and make the composition easier to apply. The volatile character of the solvent makes it possible for the joint, obtained after curing the composition, to no longer contain solvent. Thus, the solvent has, for example, no negative influence on the hardness of the joint.

When a solvent, in particular a volatile solvent, is present in the composition, its content is preferably less than or equal to 5% by weight, more preferably less than or equal to 3% by weight, with respect to the total weight of the composition.

Preferably, the content of solvent(s) in the composition is between 0% and 5% by weight.

When a pigment is present in the composition, its content is preferably less than or equal to 3% by weight, more preferably less than or equal to 2% by weight, with respect to the total weight of the composition. When it is present, the pigment can, for example, represent from 0.1% to 3% by weight or from 0.4% to 2% by weight, of the total weight of the composition.

The pigments can be organic or inorganic pigments.

For example, the pigment is $TiO_2$, in particular Kronos® 2059 sold by Kronos.

The desiccant, if it is present, can be chosen from vinyltrimethoxysilane (VTMO), vinyltriethoxysilane (VTEO) or alkoxyarylsilanes, such as Geniosil® XL 70 available from Wacker.

When a desiccant is present in the composition, its content is preferably less than or equal to 3% by weight, more preferably less than or equal to 2% by weight, with respect to the total weight of the composition. When it is present, the desiccant can, for example, represent from 0.5% to 3% by weight or from 1% to 2% by weight, with respect to the total weight of the composition.

Mention may be made, among UV stabilizers or antioxidants, of benzotriazoles, benzophenones, "hindered" amines, such as bis(2,2,6,6-tetramethyl-4-piperidyl) sebacate, and their mixtures.

Mention may be made, for example, of the products Tinuvin® 328 or Tinuvin™ 770, sold by BASF.

According to one embodiment, the composition according to the invention comprises:
from 15% to 80% by weight, preferably from 15% to 50% by weight, of at least one silylated polymer comprising at least one alkoxysilane group as defined above,
from 0.1% to 1% by weight, preferably from 0.1% to 0.6% by weight, of at least one catalyst as defined above,
from 25% to 55% by weight, preferably from 40% to 55% by weight, of at least one carbonate filler as defined above,
from 10% to 30% by weight of at least one plasticizer as defined above,
from 0.1% to 3% by weight of at least one desiccant as defined above,
from 0.1% to 10% by weight of at least one filler other than carbonate filler(s) as defined above,
from 0.1% to 20% by weight, preferably from 0.1% to 10% by weight, of at least one additive chosen from solvents, pigments, adhesion promoters, UV stabilizers (or antioxidants), glitter, fluorescent materials, rheological additives and their mixtures,
from 0.68% to 1.00% by weight, preferably from 0.69% to 1.00% by weight, preferentially from 0.75% to 1.00% by weight and advantageously from 0.80% to 1.00% by weight of at least one silsesquioxane (A) comprising at least one phenyl group and at least one alkoxy group as defined above.

Preferably, the composition according to the invention comprises (preferably consists of):
from 15% to 80% by weight, preferably from 15% to 50% by weight, advantageously from 10% to 40% by weight:
of at least one silylated polymer of formula (III), in which:
$m_1$ is an integer equal to or different from 0,
p=0 or 1, preferably p=0,
$R^4$ and $R^5$ each represent a methyl radical,
$R^3$ represents a divalent methylene or n-propylene radical,
the number-average molecular weight of said polymer ranging from 5000 to 30 000 g/mol, preferably from 10 000 to 20 000 g/mol, in particular from 14 000 to 16 000 g/mol,
and/or
of at least one silylated polymer of formula (II), in which:
p=0 or 1, preferably p=1,
$R^0$ represents a divalent n-propylene radical,
$R^4$ and $R^5$ each represent a methyl group,
the number-average molecular weight of said polymer ranging from 5000 to 30 000 g/mol, preferably from 10 000 to 20 000 g/mol,
from 0.1% to 1% by weight, preferably from 0.1% to 0.6% by weight, of at least one catalyst as defined above,
from 25% to 55% by weight, preferably from 40% to 55% by weight, of calcium carbonate,
from 10% to 30% by weight of at least one plasticizer as defined above,
from 0.1% to 3% by weight of at least one desiccant as defined above,
from 0.1% to 10% by weight of at least one filler other than carbonate filler(s) as defined above,
from 0.1% to 20% by weight, preferably from 0.1% to 10% by weight, of at least one additive chosen from solvents, pigments, adhesion promoters, UV stabilizers (or antioxidants), glitter, fluorescent materials, rheological additives and their mixtures,
from 0.68% to 1.00% by weight, preferably from 0.69% to 1.00% by weight, preferentially from 0.75% to 1.00% by weight and advantageously from 0.80% to 1.00% by weight of at least one silsesquioxane (A) comprising at least one phenyl group and at least one alkoxy group as defined above, said silsesquioxane (A) preferably corresponding to the compound of formula (I).

According to one embodiment, the composition comprises from 2 to 5, preferably from 3 to 4.5 and preferentially from 3 to 4.4 parts by weight of silsesquioxane (A) as defined above per 100 parts by weight of silylated polymer(s) as defined above.

Preferably, the composition comprises:
100 parts by weight of at least one silylated polymer comprising at least one alkoxysilane group as defined above;
from 2 to 5, preferably from 3 to 4.5 and preferentially from 3 to 4.4 parts by weight of silsesquioxane (A) as defined above;

from 100 to 300, preferably from 200 to 250, parts by weight of at least one carbonate filler.

Preferably, the composition comprises:
100 parts by weight of at least one silylated polymer comprising at least one alkoxysilane group as defined above,
from 2 to 5, preferably from 3 to 4.5 and preferentially from 3 to 4.4 parts by weight of silsesquioxane (A) as defined above,
from 100 to 300 parts by weight of at least one carbonate filler as defined above,
from 0.6 to 1.2, preferably from 0.5 to 1.0, parts by weight of at least one catalyst as defined above,
from 0.6 to 100, in particular from 1 to 50, preferably from 1.5 to 40, parts by weight of at least one additive chosen from plasticizers, solvents, pigments, adhesion promoters, desiccants, UV stabilizers (or antioxidants), glitter, fluorescent materials, rheological additives, fillers other than carbonate fillers, and their mixtures.

According to one embodiment, the composition comprises from 0.7 to 1.00 parts by weight of silsesquioxane (A) as defined above per 100 parts by weight of the sum of the other constituents of said composition, the sum of the other constituents preferably being distributed in the following way:
from 15 to 80 parts by weight, preferably from 15 to 50 parts by weight, of at least one silylated polymer comprising at least one alkoxysilane group as defined above,
from 0.01 to 1 parts by weight, preferably from 0.01 to 0.5 parts by weight, of at least one catalyst as defined above,
from 25 to 55 parts by weight, preferably from 40 to 55 parts by weight, of at least one carbonate filler as defined above,
from 10 to 30 parts by weight of at least one plasticizer as defined above,
from 0.1 to 3 parts by weight of at least one desiccant as defined above,
from 0.1 to 10 parts by weight of at least one filler other than carbonate filler(s) as defined above,
from 0.1 to 20 parts by weight, preferably from 0.1 to 10 parts by weight, of at least one additive chosen from solvents, pigments, adhesion promoters, UV stabilizers (or antioxidants), glitter, fluorescent materials, rheological additives and their mixtures.

According to one embodiment, the abovementioned composition is such that the silylated polymer(s)/silsesquioxane (A) ratio by weight is between 33 and 22, preferably between 32.9 and 22.5, preferentially between 32.85 and 22.97.

The composition according to the invention can be in the one-component form, that is to say that all the components are packaged in one and the same compartment.

The composition is preferably ready-for-use, that is to say that the user (private individual or professional) can directly apply the composition in order to produce the joint, without having to carry out premixing.

The composition can be prepared by mixing the silylated polymer or polymers and the filler(s) (carbonate and other fillers) at a temperature ranging from 5° C. to 80° C., preferably under an inert atmosphere. The catalyst or catalysts can be added at the same time or in a second stage after mixing the polymer(s) and the filler(s). The silsesquioxane (A) can also be added at the same time or in a second stage after mixing the polymer(s) and the filler(s). The other additives are introduced into the composition in accordance with the normal usages.

The compositions according to the invention comprise a moisture-crosslinkable silylated polymer, the chemical structure of which has end reactive groups of alkoxysilane type, and also a silsesquioxane (A) comprising reactive groups. The reaction of all these reactive groups with the water originating from the moisture of the air or of the substrate (known as crosslinking reaction) makes possible in particular, after the introduction of the sealant into the gap between the two substrates to be assembled, the creation of a solid three-dimensional polymeric network which confers the desired mechanical properties on the adhesive joint thus created. These mechanical properties are effectively obtained when all of the amount of sealant introduced is crosslinked, which may require several days.

This reaction, referred to as crosslinking reaction, results, once it is complete, in the formation of an adhesive joint between the two substrates which is constituted by the polymer and the silsesquioxane (A), which are crosslinked to give a three-dimensional network formed by the polymer chains connected together via bonds of siloxane type. This joint ensures in particular the solidity of the assembly of the two substrates thus obtained.

The composition according to the invention is advantageously a sealant composition, in particular an elastic sealant composition.

The composition according to the invention advantageously exhibits the following characteristics after crosslinking:
a modulus at 100% elongation of less than or equal to 0.40 MPa; and
an elastic recovery of greater than or equal to 70%.

These characteristics are typical of low modulus sealant compositions. Thus, the composition according to the invention is advantageously a low modulus sealant composition, that is to say that it results in a low modulus sealant after crosslinking.

According to the invention, the modulus at 100% elongation is the modulus at 100% elongation at 23° C. It is in particular the modulus at 100% elongation for a concrete substrate.

In the context of the invention, the "modulus at 100% elongation" is defined as the stress at 100% elongation. It makes it possible typically to measure the forces which develop in the sealant when it is stretched.

In the context of the invention, the "elastic recovery" is defined as the ability of a material to resume its initial shape after elongation. It is in particular expressed as % with respect to its initial length, representing 100%.

When the load which has brought about the elongation is removed, the sealant test specimen may more or less completely return to its original length. A good elastomeric sealant should preferably return as much as possible to its original length, so as to withstand numerous tension/compression cycles which take place during its lifetime.

The sealant composition according to the invention is advantageously classified as 25LM according to the standard ISO11600 of 2002. According to this standard, the 25LM classification requires in particular:
a modulus at 100% elongation of less than or equal to 0.40 MPa; and
an elastic recovery of greater than or equal to 70%.

In the context of the present invention, the "modulus at 100% elongation" is determined according to the test appearing in the standard ISO11600 of 2002, which refers to the standard ISO8339 of 2005.

In the context of the present invention, the "elastic recovery" is determined according to the test appearing in the standard ISO11600 of 2002, which refers to the standard ISO7389 of 2002.

The composition according to the invention is advantageously a low modulus sealant composition, exhibiting in particular a good compromise between mechanical properties, elastic properties and adhesive properties. The composition according to the invention is advantageously of use in the construction field.

The composition according to the invention advantageously makes possible a good adhesion between the substrates and advantageously makes it possible to avoid the use of adhesion primer, in particular for concrete substrates.

All the embodiments described above can be combined with one another. In particular, the different abovementioned constituents, and especially the preferred forms, of the composition can be combined with one another.

Uses

The present invention also relates to the use of a composition as defined above as adhesive, sealant or coating, preferably as sealant, for example as construction sealant.

The composition can in particular be used to form sealing and expansion joints in buildings, in particular between concrete/concrete substrates.

The present invention also relates to the use of at least one silsesquioxane (A) comprising at least one phenyl group and at least one alkoxy group as defined above for preparing a composition, in particular a sealant composition, having, after crosslinking:
- a modulus at 100% elongation of less than or equal to 0.40 MPa; and
- an elastic recovery of greater than or equal to 70%, the content of silsesquioxane (A) in the composition ranging from 0.68% to 1.00% by weight, with respect to the total weight of said composition.

In particular, the invention relates to said composition comprises:
- from 0.68% to 1.00% by weight of at least one silsesquioxane (A) comprising at least one phenyl group and at least one alkoxy group;
- at least one silylated polymer comprising at least one alkoxysilane group, preferably from 3% to 80% of at least one silylated polymer comprising at least one alkoxysilane group; and at least 25% by weight of at least one carbonate filler, the percentages by weight being expressed with respect to the total weight of said composition.

The ingredients and characteristics described above for the composition also apply for the abovementioned use.

In the context of the invention, "between x and y" or "ranging from x to y" is understood to mean an interval in which the limits x and y are included. For example, the range "between 0.68% and 1.00%" includes in particular the values 0.68% and 1.00%.

The following examples illustrate the invention without, however, limiting it.

EXPERIMENTAL PART

Preparation of the Compositions A to F

The following products were used in the manufacture of the sealant compositions according to the invention:
the following silylated polymers:
   Geniosil® XB502 (available from Wacker);
   MS Polymer® S 227 (available from Kaneka);
   Desmoseal® SXP2636 (available from Bayer);
Silquest® A-1120: catalyst of γ-(N-(β-aminoethyl)amino) propyltrimethoxysilane type, available from Momentive;
Mikhart® 1T: calcium carbonate exhibiting a density of 2.7, a loose bulk density of 0.7 g/cm$^3$ and a tapped bulk density of 1 g/cm$^3$, available from La Provençale;
DC 3074® (CAS number: 68957-04-0): dimethyl, methoxy phenyl, phenyl silsesquioxanes terminated by methoxy, available from Dow Corning;
DC 3037® (CAS number: 68957-04-0): dimethyl, methoxy phenyl, phenyl silsesquioxanes terminated by methoxy, available from Dow Corning;
DBU: diazabicycloundecene crosslinking catalyst, available from Sigma-Aldrich;
Mesamoll®: plasticizer which is an ester of alkylsulfonic acid and of phenol, available from Lanxess;
Kronos® 2059: TiO$_2$ pigment, available from Kronos;
Crayvallac® SLX: rheological additive, available from Arkema;
Tinuvin™ 770: antioxidant of bis(2,2,6,6-tetramethyl-4-piperidinyl) sebacate type, available from BASF;
Tinuvin® 328: UV absorber of benzotriazole type, available from BASF;
Dynasylan® VTMO: vinyltrimethoxysilane desiccant, available from Evonik.

The compositions A to F were prepared according to the following procedure:

TABLE 1

| | Compositions A to F | | | | | |
|---|---|---|---|---|---|---|
| | A (comparative) | B (comparative) | C | D | E | F (comparative) |
| MS ® S 227 | 70.0 | 70.0 | 70.0 | 70.0 | 70.0 | 70.0 |
| Desmoseal ® SXP2636 | 159.7 | 159.7 | 159.7 | 159.7 | 159.7 | 159.7 |
| Mesamoll ® | 192.8 | 192.8 | 192.8 | 192.8 | 192.8 | 192.8 |
| Kronos ® 2059 | 19.8 | 19.8 | 19.8 | 19.8 | 19.8 | 19.8 |
| Tinuvin ® T770 | 2.5 | 2.5 | 2.5 | 2.5 | 2.5 | 2.5 |
| Tinuvin ® 328 | 2.5 | 2.5 | 2.5 | 2.5 | 2.5 | 2.5 |
| Crayvallac SLX | 35.0 | 35.0 | 35.0 | 35.0 | 35.0 | 35.0 |
| Mikhart ® 1T | 497.0 | 497.0 | 497.0 | 497.0 | 497.0 | 497.0 |
| VTMO | 14.8 | 14.8 | 14.8 | 14.8 | 14.8 | 14.8 |

TABLE 1-continued

Compositions A to F

| | A (comparative) | B (comparative) | C | D | E | F (comparative) |
|---|---|---|---|---|---|---|
| Silquest ® A-1120 | 4.9 | 4.9 | 4.9 | 4.9 | 4.9 | 4.9 |
| DBU | 1.0 | 1.0 | 1.0 | 1.0 | 1.0 | 1.0 |
| Geniosil ® XB-502 | | | 10.0 | | | |
| DC ® 3074 | | 5.0 | | 8.0 | 10.0 | 15.0 |

In this table 1, the proportions shown are in parts by weight.

The compositions A, B and E are comparative compositions, in which the content of silsesquioxane (A) is:
  equal to 0 (composition A);
  less than 0.5% by weight, with respect to the total weight of the composition (composition B), or
  greater than 1.4% by weight, with respect to the total weight of the composition (composition E).

Properties of the Crosslinked Compositions

The properties obtained for the sealant compositions A to F are summarized in the following table 2:

TABLE 2

| | A (comparative) | B (comparative) | C | D | E | F (comparative) |
|---|---|---|---|---|---|---|
| Skinning time (in min) | 40 | 50 | 30 | 65 | 40 | 60 |
| Cure 24 h (mm) | 3.5 | 3.5 | 3.5 | 3.5 | 3 | 2.5 |
| Extrusion rate (in g/min) | 85 | 180 | 60 | 133 | 65 | 176 |
| Elongation at break (in %) (concrete substrate) | 133 | 228 | 182 | 207 | 213 | 252 |
| Modulus at 100% elongation (concrete substrate) (in MPa) | 0.50 | 0.42 | 0.40 | 0.38 | 0.31 | 0.23 |
| Elastic recovery (in %) | 80 | 75 | 76 | 72 | 70 | 50 |
| Rupture observed during the elastic recovery test | 1 | 0 | 0 | 0 | 0 | 0 |

The skinning time was measured in a controlled atmosphere at a temperature of 20° C. and a relative humidity of approximately 60%.

The composition was applied using a wooden spatula and in the form of a thin film with a thickness of approximately 0.5 mm to a glass slide with a length of 76 mm and a width of 26 mm. Immediately after the application of said film, a stopwatch was started and it was examined every minute, using gentle pressure with the finger, if the film is dry or if a composition residue is transferred onto the finger. The skinning time is the time at the end of which the composition film is dry and for which there is no longer any transfer of adhesive residue onto the finger. The result is expressed in minutes.

The measurement of the tensile strength and the elongation at break by a tensile test was carried out according to the protocol described below.

The principle of the measurement consists in drawing, in a tensile testing device, the movable jaw of which moves at a constant rate equal to 100 mm/minute, a standard test specimen consisting of the crosslinked composition and in recording, at the moment when the test specimen breaks, the tensile stress applied (in MPa) and also the elongation of the test specimen (in %). The standard test specimen is dumbbell-shaped, as illustrated in the international standard ISO 37. The narrow part of the dumbbell used has a length of 20 mm, a width of 4 mm and a thickness of 500 μm.

The cure 24 h consists in acting on, in right-angle peeling, a flat strip of the product to be examined, of constant width and of increasing thickness. This strip was obtained by filling a calibrated trough, with a width of 10 mm and a depth varying linearly from 0 to 10 mm. The assembly was made of PTFE. After application for 24 h in a climate-controlled chamber at 23° C. and 50% RH, the level at which the product, still pasty (not polymerized over the thickness), is stuck to the assembly was recorded using graduations.

The modulus at 100% elongation was measured according to the test appearing in the standard ISO11600 of 2002, which refers to the standard ISO8339 of 2005.

The elastic recovery was determined according to the test appearing in the standard ISO11600 of 2002, which refers to the standard ISO7389 of 2002.

The results of table 2 show that the compositions according to the invention C, D and E advantageously result in low modulus elastic sealants, insofar as:
  the modulus at 100% elongation is less than or equal to 0.40 MPa; and
  the elastic recovery is greater than or equal to 70%.

On the contrary, the comparative compositions A, B and F do not exhibit these low modulus sealant characteristics. The comparative compositions A and B have in particular a modulus at 100% elongation of greater than 0.40 MPa, while the comparative composition F exhibits an elastic recovery of less than 70%.

The compositions C, D and E according to the invention result in sealants advantageously exhibiting a good compromise between good mechanical properties, elastic and adhesive properties. The compositions C, D and E exhibit in particular a good adhesion to concrete substrates.

The invention claimed is:

1. A composition comprising:
   from 0.68% to 1.00% by weight of at least one silsesquioxane (A) comprising at least one phenyl group and at least one alkoxy group;
   at least one silylated polymer comprising at least one alkoxysilane group; and
   at least 25% by weight of at least one carbonate filler, the percentages by weight being expressed with respect to the total weight of said composition.

2. The composition as claimed in claim 1, in which the silsesquioxane (A) has the following general formula (I):

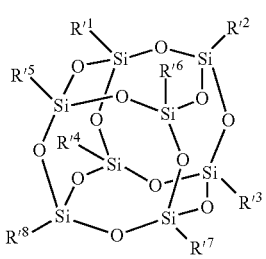

(I)

wherein each of $R'^1$ to $R'^8$ represents, independently of one another, a group chosen from:
a hydrogen atom,
a radical selected from the group consisting of a linear or branched $C_1$-$C_4$ alkoxy radical, a linear or branched alkyl radical comprising from 1 to 30 carbon atoms, an alkenyl radical comprising from 2 to 30 carbon atoms, an aromatic radical comprising from 6 to 30 carbon atoms, a cyclic aliphatic radical comprising from 3 to 30 carbon atoms and an acyl radical comprising from 1 to 30 carbon atoms, and
an —$OSiR'^9R'^{10}$ group in which $R'^9$ and $R'^{10}$ each represents, independently of each other, a hydrogen atom or a radical selected from the group consisting of linear or branched $C_1$-$C_4$ alkyls, linear or branched $C_1$-$C_4$ alkoxys, $C_2$-$C_4$ alkenyls, a phenyl, a $C_3$-$C_6$ allyl radical, a cyclic $C_3$-$C_8$ aliphatic radical and a $C_1$-$C_4$ acyl radical;

provided:
that at least one radical among the $R'^1$ to $R'^8$ radicals is a $C_1$-$C_4$ alkoxy radical; and
that at least one radical among the $R'^1$ to $R'^8$ radicals is a phenyl radical.

3. The composition as claimed in claim 1, wherein the silsesquioxane (A) comprises from 10% to 20% by weight of alkoxy group.

4. The composition as claimed in claim 1, wherein the silsesquioxane (A) comprises at least one methyl group.

5. The composition as claimed in claim 4, wherein the silsesquioxane (A) comprises a phenyl group(s):methyl group(s) ratio by weight ranging from 1:10 to 10:1.

6. The composition as claimed in claim 1, wherein the silsesquioxane (A) has a viscosity at 23° C. ranging from 10 to 200 mPa·s.

7. The composition as claimed in claim 1, wherein the silsesquioxane (A) has a weight-average molar mass ranging from 500 g/mol to 3000 g/mol.

8. The composition as claimed in claim 1, wherein the content of silsesquioxane (A) in said composition is selected from the group consisting of one of the following contents by weight: from 0.68% to 1.00%, from 0.69% to 1.00%, from 0.70% to 1.00%, from 0.71% to 1.00%, from 0.72% to 1.00%, from 0.73% to 1.00%, from 0.74% to 1.00%, from 0.75% to 1.00%, from 0.76% to 1.00%, from 0.77% to 1.00%, from 0.78% to 1.00%, from 0.79% to 1.00%, from 0.80% to 1.00%, from 0.81% to 1.00%, from 0.82% to 1.00%, from 0.83% to 1.00%, from 0.84% to 1.00%, from 0.85% to 1.00%, from 0.86% to 1.00%, from 0.87% to 1.00%, from 0.88% to 1.00%, from 0.89% to 1.00%, from 0.90% to 1.00%, from 0.91% to 1.00%, from 0.92% to 1.00%, from 0.93% to 1.00%, from 0.94% to 1.00%, and from 0.95% to 1.00%.

9. The composition as claimed in claim 1, wherein the silylated polymer(s)/silsesquioxane (A) ratio by weight is between 33 and 22.

10. The composition as claimed in claim 1, comprising from 2 to 5 parts by weight of silsesquioxane (A) per 100 parts by weight of silylated polymer(s).

11. The composition as claimed in claim 1, in which the silylated polymer comprising at least one alkoxysilane group is selected from the group consisting of the polymers of formulae (II), (III) and (IV) as defined below, and their mixtures:

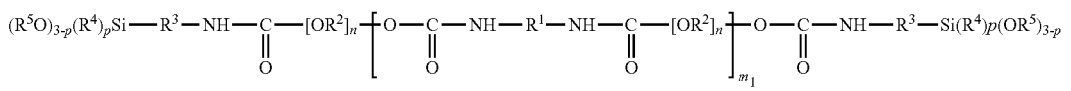

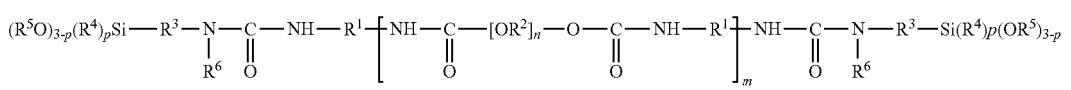

wherein:
$R^1$ represents a divalent hydrocarbon radical comprising from 5 to 15 carbon atoms which can be aromatic or aliphatic and linear, branched or cyclic,
$R^0$ represents a linear or branched divalent alkylene radical comprising from 3 to 6 carbon atoms,
$R^3$ represents a linear or branched divalent alkylene radical comprising from 1 to 6 carbon atoms, $R^3$ preferably representing methylene or n-propylene,
$R^2$ represents a linear or branched divalent alkylene radical comprising from 2 to 4 carbon atoms, R⁴ and R⁵, which are identical or different, each represent a linear or branched alkyl radical comprising from 1 to 4 carbon atoms, R⁶ represents a hydrogen atom, a phenyl radical or a linear, branched or cyclic alkyl radical comprising from 1 to 6 carbon atoms, a 2-succinate radical of formula:

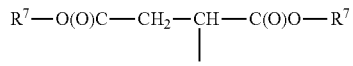

in which R⁷ is a linear or branched alkyl radical comprising from 1 to 6 carbon atoms, n is an integer such that the number-average molecular weight of the polyether block of formula —[OR²]ₙ— ranges from 300 g/mol to 40 000 g/mol, m₁ is zero or an integer, n and m₁ are such that the number-average molecular weight of the polymer of formula (III) ranges from 500 g/mol to 50 000 g/mol, m is an integer other than zero, n and m are such that the number-average molecular weight of the polymer of formula (IV) ranges from 500 g/mol to 50 000 g/mol, p is an integer equal to 0, 1 or 2.

12. The composition as claimed in claim 11, comprising:
at least one polymer of formula (II) and at least one polymer of formula (III); or
at least one polymer of formula (II) and at least one polymer of formula (IV); or
at least one polymer of formula (III) and at least one polymer of formula (IV); or
at least one polymer of formula (II), at least one polymer of formula (III) and at least one polymer of formula (IV).

13. The composition as claimed in claim 11, in which the polymer of formula (III) is such that:
m₁ is an integer equal to or different from 0,
p=0 or 1,
R⁴ and R⁵ each represent a methyl radical,
R³ represents a divalent methylene or n-propylene radical,
the number-average molecular weight of said polymer ranges from 5000 to 30 000 g/mol.

14. The composition as claimed in claim 11, in which the polymer of formula (II) is such that:
p=0 or 1,
R⁰ represents a divalent n-propylene radical,
R⁴ and R⁵ each represent a methyl group,
the number-average molecular weight of said polymer ranges from 5000 to 30 000 g/mol.

15. The composition as claimed in claim 1, comprising:
from 3% to 80% by weight of at least one silylated polymer comprising at least one alkoxysilane group,
from 0.1% to 1% by weight of at least one catalyst,
from 25% to 80% by weight of at least one carbonate filler,
from 0% to 30% by weight of at least one additive comprising plasticizers, solvents, pigments, adhesion promoters, desiccants, UV stabilizers, glitter, fluorescent materials, rheological additives, fillers other than carbonate fillers, or their mixtures, and
from 0.68% to 1.00% by weight of at least one silsesquioxane (A) comprising at least one phenyl group and at least one alkoxy group.

16. The composition as claimed in claim 1, comprising:
from 15% to 80% by weight of at least one silylated polymer comprising at least one alkoxysilane group,
from 0.1% to 1% by weight of at least one catalyst,
from 25% to 55% by weight of at least one carbonate filler,
from 10% to 30% by weight of at least one plasticizer,
from 0.1% to 3% by weight of at least one desiccant,
from 0.1% to 10% by weight of at least one filler other than carbonate filler(s),
from 0.1% to 20% by weight of at least one additive comprising solvents, pigments, adhesion promoters, UV stabilizers, glitter, fluorescent materials, rheological additives or their mixtures, and
from 0.68% to 1.00% by weight of at least one silsesquioxane (A) comprising at least one phenyl group and at least one alkoxy group.

17. The composition as claimed in claim 1, wherein the carbonate filler is selected from the group consisting of alkali metal or alkaline earth metal carbonates and their mixtures.

18. The composition as claimed in claim 1, wherein it exhibits the following characteristics after crosslinking:
a modulus at 100% elongation of less than or equal to 0.4 MPa; and
an elastic recovery of greater than or equal to 70%.

* * * * *